US006732276B1

(12) United States Patent
Cofler et al.

(10) Patent No.: US 6,732,276 B1
(45) Date of Patent: May 4, 2004

(54) GUARDED COMPUTER INSTRUCTION EXECUTION

(75) Inventors: Andrew Cofler, Voreppe (FR); Bruno Fel, Voreppe (FR); Laurent Ducousso, Sain Nazaire les Eymes (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/563,468

(22) Filed: May 2, 2000

(30) Foreign Application Priority Data

May 3, 1999 (EP) .......................................... 99410053

(51) Int. Cl.[7] ............................................. G06F 17/00
(52) U.S. Cl. ....................... 713/200; 713/190; 713/189
(58) Field of Search ................................ 713/187, 494, 713/200–202, 162–167

(56) References Cited

U.S. PATENT DOCUMENTS

| 5,889,984 A | | 3/1999 | Mills | |
|---|---|---|---|---|
| 6,643,781 B1 | * | 11/2003 | Merriam | 713/201 |
| 6,651,171 B1 | * | 11/2003 | England et al. | 713/194 |
| 6,658,567 B1 | * | 12/2003 | Barton et al. | 713/193 |

FOREIGN PATENT DOCUMENTS

| EP | 0 403 014 | 12/1990 | G06F/15/80 |
|---|---|---|---|
| EP | 0 490 524 | 6/1992 | G06F/9/38 |

OTHER PUBLICATIONS

Yoshida et al., A strategy for avoiding pipeline interlock delays in a microprocessor, Computer Design: VLSI in Computers and Processors, 1990, ICCD '90 Proceedings, 1990 IEEE International Conference on Sep. 17–19, 1990, pp. 14–19.*

Sakai et al., Reduced interprocessor–communication architecture for supporting programming models, Programming Models for Massively Parallel Computers, 1993, Proceedings, Sep. 20–23, 1993, pp. 134–143.*

Mills, A pipelined architecture for logic programming with a complex but single–cycle instruction set, Tools for Artifical Intelligence, 1989, Architecture, Languages and Algorithms, IEEE International Workshop on, Oct. 23–25, 1989, pp. 526–533.*

European Search Report from European Application No. 99410053.

Labrousse J, et al., *Create–Life: A Modular Design Approach for High Performace ASIC's*, Computer Society International Conference (COMPCOM), Spring Meeting, Los Alamitos, Feb. 26–Mar. 2, 1990, pp. 427–433, XP000146217.

* cited by examiner

*Primary Examiner*—David Jung
(74) *Attorney, Agent, or Firm*—Lisa K. Jorgenson; James H. Morris; Wolf, Greenfield & Sacks, P.C.

(57) ABSTRACT

A computer system has a plurality of parallel execution units for executing instructions with assigned guard indicators, one execution unit including a master guard value store and another execution unit having a shadow guard value store, together with guard ownership circuitry to indicate whether the shadow guard value store owns the current value of the guard indicator and transfer circuitry operable to transfer a guard value from the master store to another execution unit.

14 Claims, 1 Drawing Sheet

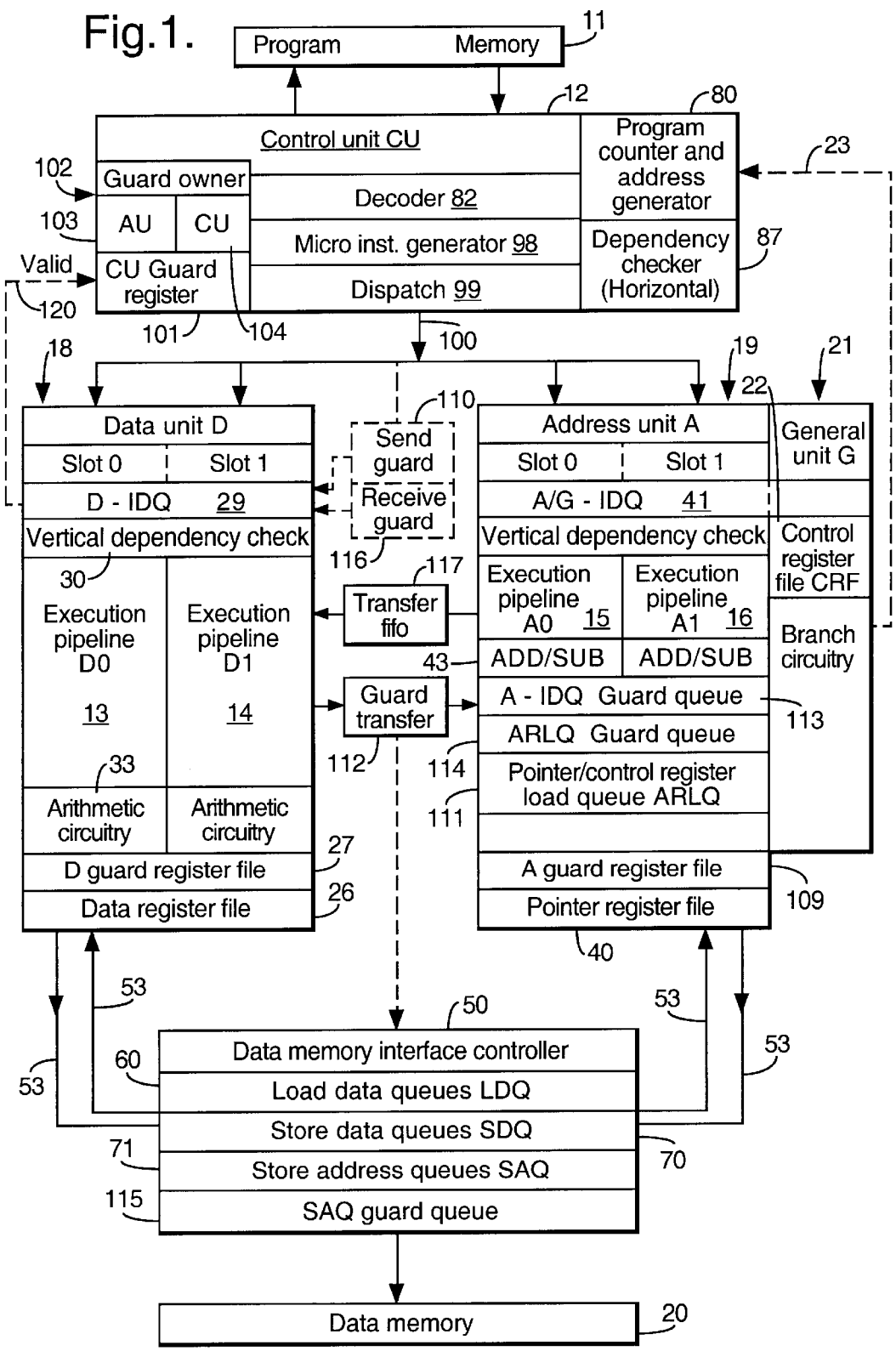

GUARDED COMPUTER INSTRUCTION EXECUTION

BACKGROUND OF THE INVENTION

Computer systems are known in which instructions include a guard indicator so that the execution or otherwise of the instruction is dependent upon the guard value. Problems do however arise when a plurality of instructions are executed simultaneously in a plurality of parallel execution units. This may arise in computer systems operating in superscalar or very long instruction word (VLIW) instruction modes so that the execution of some instructions may effect the guard values to be associated with other instructions in parallel execution units. Problems may also arise from pipelined execution of instructions so that the execution of some later instructions commences prior to the completion of execution of earlier instructions in the pipeline.

It is an object of the present invention to provide computer apparatus and methods which enable efficient transfer of guard values between more than one execution units.

Guarded instruction execution has the same meaning as predicated instruction execution.

SUMMARY OF THE INVENTION

The invention provides a computer system for executing instructions having assigned guard indicators, which system comprises instruction supply circuitry, a plurality of parallel execution units for receiving respective instructions from the supply circuitry, each instruction having a respective guard indicator selected from a set of guard indicators, common to the plurality of execution units, one of said execution units including a master guard value store containing a master representation of current values for the guard indicators in said set of guard indicators, another of said execution units including a shadow guard value store containing a secondary representation of values for the guard indicators in said set, guard ownership circuitry to indicate whether said shadow guard value store owns the current value for a guard indicator, and guard value transfer circuitry operable to transfer a guard value from said master store to said another execution unit thereby enabling selection of a guard value for said another of said execution units from either the master or shadow guard value store depending on the indication of the guard ownership.

Preferably said execution unit includes circuitry for executing guard value modifying instructions and said guard value transfer circuitry is operable to transfer to, and thereby update, said master guard value store any modified guard value generated in said another execution unit.

Preferably the instruction supply circuitry comprises a control unit common to each parallel execution unit, said control unit including said guard ownership circuitry and being operable in response to an indication of guard ownership to supply to the execution unit instructions to enable access to a selected one of the guard value stores.

Preferably said control unit includes a further secondary store of guard values and said guard ownership circuitry is operable to indicate whether ownership of a selected guard value is held by said secondary store of guard values in the control unit.

Preferably said control unit includes an instruction dispatch unit for dispatching instructions to said parallel execution units, said dispatch unit being responsive to said secondary store of guard values and to said guard ownership circuitry to prevent dispatch of instructions for which the guard value is owned by the control unit and known to be false.

Preferably said dispatch unit is operable to dispatch an instruction with a predetermined guard value requiring normal execution of the instruction in response to locating that the guard value for the instruction is owned by the control unit and indicated by said secondary store as a true value.

The invention provides a method of executing instructions in a computer system, said instructions having assigned guard indicators, which method comprises supplying a plurality of instructions to parallel execution units, each instruction having a respective guard indicator selected from a set of guard indicators common to the plurality of execution units, holding a master set of current values for the guard indicators in one execution unit, holding a shadow set of guard values in another execution unit, indicating which execution unit has guard ownership for the guard indicator of any one instruction being executed, execution of an instruction in said another execution unit obtaining the guard value from the shadow value if guard ownership of that guard indicator is owned by said another execution unit or effecting a transfer of the master guard value from said one execution unit if guard ownership of that guard value is not owned by said another execution unit.

Preferably the method includes executing instructions to modify said guard values wherein execution of an instruction to modify a guard value in said one execution unit updates said master value without changing said shadow value.

Preferably execution of an instruction in said another execution unit to modify a guard value is used to update said shadow guard value and to transfer the new guard value to update the master value in said one execution unit.

BRIEF DESCRIPTION OF THE DRAWING

The accompanying drawing which shows a computer system in accordance with the present invention.

DESCRIPTION OF THE PREFERRED EMBODIMENT

The computer system of this example is arranged for the parallel execution of a plurality of instructions and is particularly suited to providing a high digital signal processing (DSP) performance. Instructions are held in a program memory 11 and after passing through a control unit 12 are supplied to four parallel execution pipelines 13,14,15 and 16. Pipelines 13 and 14 are shown as slot 0 and slot 1 of a data unit arranged to execute instructions carrying arithmetic operations. Pipelines 15 and 16 are shown as slot 0 and slot 1 of an address unit 19 used to execute instructions for memory accesses to a data memory 20. Slot 0 or Slot 1 of the address unit 19 may also be used to supply instructions to a general unit 21 which shares some resources with the address unit 19. The general unit 21 includes a control register file 22 as well as branch circuitry which is used to provide instruction branch information on line 23 to the control unit 12.

The two pipelines 13 and 14 in the data unit 18 share a common data register file 26 and a common guard register file 27 holding the master guard values which may be associated with the instructions. The two pipelines also derive instructions from a common instruction dispatch queue (D-IDQ) 29 in the data unit 18 and instructions in the queue 29 are checked for data dependency by common vertical dependency check circuitry 30 in the data unit 18. The sequence of operations in each of the pipeline stages in the data unit 18 include an operand fetch usually accessing one of the register files 26 or 27 followed by two execution stages which use arithmetic circuitry 33 followed by a data write stage at which the result of an arithmetic operation is returned to the register file 26 and 27. A similar pipeline exists for both pipelines 13 and 14 on the data unit 18.

Similarly for the address unit 19, both pipelines 15 and 16 access a common register file 40 holding pointer values for use in load or store operations in the data memory 20. The two pipelines each take their instructions from a common instruction dispatch queue (A-IDQ) 41 and a similar vertical dependency check is provided in common for both pipelines 15 and 16 in the address unit 19. The vertical dependency check is similar to that already referred to in the data unit 18. In executing instructions through the two pipelines 15 and 16, accesses will be made to the register file 40. Add and subtract units 43 are used in execution of the instructions. Each of the pipelines 15 and 16 in the address unit 19 includes an operand fetch followed by an execution stage and an address write back stage.

Both the data unit 18 and the address unit 19 are connected to the data memory 20 through a data memory interface control 50. The control 50 is connected by buses 53 to both the data unit 18 and the address unit 19. The interface control 50 includes a plurality of queues each connected to the buses 53. These queues include load data queues (LDQ) 60 for data awaiting loading into register files of the data unit 18 or address unit 19. The interface control 50 also includes store data queues (SDQ) 70 for data awaiting storage in the memory 20. Store address queues (SAQ) 71 are provided to indicate the locations in the memory 20 at which the data is to be stored.

It will be understood that when instructions are executed to load data from the data memory 20 into the data register files of the data unit 18, the address unit 19 will access the data memory 20 and load the required data into the load data queues 60 prior to completing the update of the data register file 26 by transferring the data from the appropriate queue 60. Similarly when instructions are executed to store data from the data unit 18 into the data memory 20 the appropriate data may be held in the store data queues 70 together with the store addresses in queue 71 prior to completing the store operation in the data memory 20.

By executing the memory addressing instruction in the address unit 19 in separate parallel pipelines from those provided in the data unit 18, the computer system operates access decoupling in that the memory accesses are effected independently of the arithmetic operations carried out within the data unit 18. This reduces the problem of memory latency. In a digital signal processing system which operates regular and repeated operations the memory latency can be hidden from the executing program. In the above description, all instructions which are fed through pipelines 13, 14, 15 and 16 are subject to a vertical dependency check and if any data dependency is found which cannot be resolved by a bypass, the execution unit operates to cause a temporary stall in one of the pair of pipelines 13 or 14 or in the pair 15 and 16 so as to cause a temporary delay in one of the pipelines of the pair so as to resolve the data dependency. The operand fetch stage in each of the pipelines looks to see the first entry in the IDQ and performs the vertical dependency check between the operands of this entry and the operands that are already in the pipelines. If there is no dependency problem it performs the operand fetch and reads the micro-instructions from the IDQ. If there is a problem, it does not perform the operand fetch on that cycle so the micro-instruction stays in the IDQ and starts again on the next cycle with the same micro-instructions. The delay may be induced by the instruction dispatch queue 29 or 41 providing a signal corresponding to no operand fetch being fed to the execution pipeline for each cycle of delay that is required in order to resolve the data dependency. It will be understood that a check for a data dependency includes any form of data, including data representing guard values.

The control unit 12 is also arranged to provide a horizontal dependency check. In this specification a data dependency between instructions that are supplied to the parallel pipelines in the same machine cycle is referred to as a horizontal dependency. The control unit 12 includes a program counter and address generator 80 to provide a memory address for an instruction fetch operation from the program memory 11. The machine may operate in a selected one of a plurality of instruction modes including superscalar modes of variable instruction bit length or in very long instruction word (VLIW) mode. The control unit 12 may include a process status register to indicate the instruction mode in which the machine is operating.

In use, a plurality of instructions are obtained from the memory 11 in a single fetch operation during one cycle and are decoded by a decoder 82 in the control unit 12. They are checked for horizontal data dependency by dependency checking circuitry 87 to indicate if a horizontal data dependency has been located. After decoding, the instructions are used to generate microinstructions for each of the execution pipelines. The instructions from the decoder 82 are passed to a microinstruction generator 98 which generates a plurality of parallel microinstructions which are output by a dispatch circuitry 99 through parallel paths 100 to the four parallel execution pipelines 13, 14, 15 and 16 and for the general unit 21. If a horizontal dependency was located, the microinstructions on lines 100 would include an indication to the instruction dispatch queues of the data unit 18 or address unit 19 that some action, such as a pipeline stall, was necessary in the execution pipelines to resolve the horizontal dependency.

In this example, each instruction is provided with a guard indicator G between G0 and G15 which is encoded into the instruction. If the indicator has a guard value which is true (has the value of 1), then the instruction will be executed normally (ie updates the architectural state of the machine). If the indicator has a guard value which is false (has the value of 0), then normal execution of the instruction will not be completed (ie the architectural state of the machine is not changed by the instruction). Resolution of a guard value may be done in different pipeline stages of the machine.

The guard for each instruction may be selected between G0 and G15 and in this particular example the guard G15 is always true. The value true or false attributed to guards G0–G14 is however dependent upon the guard values held at any particular time in a guard register file. The master guard register file in this example is guard register file 27 in the data unit 18. However, a supplementary or shadow guard register file (normally copies of the master file 27) is provided by a control unit guard register file 101 in the control unit 12. The control unit 12 also includes a register 102 to indicate which unit is currently known to be the guard owner in respect of each guard indicator. Register 102 has a first bit 103 for each guard indicator which if holding the value 1 indicates that the address unit 19 is currently the guard holder for that indicator. If bit 104 for each guard indicator is set to the value 1 then it indicates that the control unit 12 is currently the guard owner for that guard indicator. If neither bit 103 nor 104 is set then the default condition indicates that the master guard register file 27 must be used so that the data unit 18 is the guard owner. The address unit also has a shadow guard register file 109 which may be updated by guard modifier instructions executed by the address unit 19. The guard values held in the guard register files can be changed by a guard modifier instruction (GMI) instruction executed by the data unit 18 or the address unit 19. Those executed by the data unit will update the master file 27 and the shadow file 101. Those executed by the address unit will update the shadow file 100 and the master file 27 (and hence the shadow file 101).

In normal operation the guard register file 27 in the data unit 18 maintains the architectural state of the guard values G0 to G14 and the register file is common to both execution pipelines 13 and 14. The operative values of the guards are the same for all execution pipelines although as will be explained below, the different pipelines may access different register files to obtain the guard values.

In this example the master register file for the guard values is held in the data unit 18 as it is the data unit that will most commonly execute instructions likely to change the value of the guards. Greater efficiency of execution cycles is therefore achieved by maintaining the master guard values in the register file which is directly accessed by execution of the instructions in the data unit 18. When instructions are fed through either slot 0 or slot 1 of the data unit 18 the required guard value may be taken directly from the master guard register file 27 in accordance with the guard indicator that accompanied the microinstructions fed into the data unit 18 from the control unit 12, unless the control unit 12 is the owner of the guard in which case the guard value will have been taken from the shadow registers 101 in the control unit 12.

In the case of instructions to the address unit 19, the more general position will be the default condition in the guard owner register 102 indicating that guard ownership does not belong to the address unit 19 or the control unit 12 and consequently the guard values required for execution of the instructions in the address unit 19 will need to be obtained from the guard register file 27 in the data unit 18. The microinstructions fed through lines 100 to the execution units will include supplying a "send guard" (sndG) instruction to the data unit 18 as the same time as supplying the appropriate microinstruction to the correct slot of the address unit 19. The "send guard" instruction will be slotted into the instruction dispatch queue 29 of the data unit 18 in the same cycle of operations as the microinstruction required for the address unit 19 is slotted into the instruction dispatch queue 41 for the address unit. All micro-instructions in a given execution unit are always executed in order and all guard manipulations and transfers are maintained in order with respect to these micro-instructions. This guarantees the synchronicity of guard transfers (ie for every guard emission from a given execution unit there is an opposite guard reception in another execution unit and all these are done in order. The control unit has responsibility to generate the correct micro-instructions for guard transfers; the sending or receiving execution unit only sees the send or receive (respectively) micro-instruction ie the action that it must do). In this way the correct sequencing occurs with the correct guard value being obtained from the guard register file 27 corresponding to the instruction being executed in the address unit 19. The supply of the "send guard" instruction in such a situation is illustrated at 110 in the drawing. The address unit 19 has a queue of instructions 41 awaiting dispatch to the execution units. It also has a queue 111 (ARLQ) of items awaiting loading into the pointer or control registers 40 or 22. There is also the queue 71 in the memory interface control 50 of store addresses queues awaiting a memory access as a result of partial execution of a store instruction in the address unit 19. When the address unit 19 awaits a guard transfer from the data unit 18, the instruction in the address unit 19 is stalled in the A-IDQ 41 or in the ARLQ 111 or in the store address queue 71 until the requested guard value is transmitted from the data unit 18 through guard transfer circuitry 112 to the required destination. The transfer of the correct guard value will occur when the data unit 18 executes in its pipeline operation the "send guard" instruction and the guard value which is transferred to either the address unit 19 or the data memory interface control 50 will need to be held in a queue ready for continued execution of the instruction once the stall is terminated. The transferred guard value will be held in an A-IDQ guard queue 113 if the guarded instruction was stalled in the IDQ 41. If the stall was in the ARLQ queue 111 then the transferred guard value will be held in an ARLQ guard queue 114. In the case of a store instruction where the store address had been added to the SAQ 71 in the interface control 50, the guard value will be transferred from circuitry 112 to an SAQ guard queue 115 in the data memory interface control 50 so that the memory access may be implemented in accordance with the entry in the SAQ 71 if the guard value transferred permits this. It will be seen that by this provision, the address unit can execute a memory store instruction as far as identifying the required store address and adding that address to a queue in the interface 50 prior to checking whether or not the guard value of the store instruction is true or false. The store operation will be held in the queue 71 until the guard value is checked and will only proceed to completion if the guard value is true. In each case where the guard value is transferred to the address unit 19 from the data unit 18, the stalled instruction for the address unit or general unit 21 will be resumed or rendered inoperative depending on the guard value transferred from the data unit file 27.

The use of the guard queues 113, 114 and 115 allow resynchronisation of the guard values with the microinstruction that caused the request "send guard" 110 to be sent to the data unit 18. The above description for operation of a guarded store instruction indicated how the effective store address could be put on the queue 71 prior to resolving the guard value. The address unit 19 may be operated with an earlier stall in the execution of a store instruction so that the effective address is not calculated and fed to the interface control 50 until after the guard value has been transferred and resolved. Similarly a guarded load instruction may be executed by the address unit 19 to access the memory and obtain the required data for addition to the load data queue 60 prior to resolving the guard value. Alternatively the address unit may cause an earlier stall awaiting resolution of the guard value transferred from the data unit prior to obtaining the data from the memory and putting it into the queue 60. In the case where the data is obtained from the memory and put onto the load data queue 60 prior to resolution of the guard value, the appropriate register file 26, 40 or 22 is updated by a load operation from the load data queue 60 only if the guard value is found to be true. In the case of a false guard value, the register files are not updated and the appropriate execution unit effects a read of the load data queue 60 to remove the unwanted data from the queue without updating any destination register file.

As indicated above, the guard values to be assigned to the guard indicators G0–G14 can be modified by executing a guard modifier instruction. These can be executed by either the data unit 18 or the address unit 19. In the case of a guard modifier instruction executed by the data unit 18, the new guard value is calculated in the execution pipeline of the appropriate slot 0 or slot 1 of the data unit 18 and, whichever of these pipelines has been used, it will cause a new value of the guard to be written into the guard register file 27 at the end of the execution pipeline in order to update the register file 27. The guard modifier instructions may themselves be guarded.

In the case of the guard modifier instruction which is supplied to the address unit 19, the new value will be calculated on execution of the instruction in either slot 0 or slot 1 pipeline of the address unit 19 and the new value can be written into the address guard register file 100 of the address unit 19 at the end of the execution pipeline. However it is necessary for the new guard value to be transferred to the master guard register file 27 of the data unit 18 in order to update that master file at the correct cycle of operation. To achieve this, the control unit 12 arranges to supply through lines 100 a "receive guard" instruction to the data unit 18 simultaneously with the supply of any microinstruction to the address unit 19 which will cause a new guard value to be calculated by the address unit 19. This "receive guard" instruction is illustrated at 116 in the drawing and is added to the instruction dispatch queue 29 of the data unit 18 in the same cycle as the microinstruction generating a new guard value is supplied to the address unit 19. As soon as the execution pipeline in the address unit 19 has calculated the new guard value it is supplied to a transfer FIFO 117 to enable supply of the new guard value to the data unit 18. The "receive guard" instruction supplied to the data unit 18 is treated by the data unit 18 in the same way as a guard modifier instruction except that it does not need to calculate the new guard value but merely obtains it from the FIFO 117.

The microinstruction generating the guard value is supplied to the IDQ 41 of the address unit 19 in the same cycle as the "receive guard" microinstruction is fed to the IDQ 29 of the data unit 18. As explained above, synchronisation is achieved between the two units so that the new guard value transferred through the FIFO 117 updates the master register file 27 at the correct point in the sequence of the instruction execution.

It is possible to execute a load GR instruction in order to load from memory 20 into the guard register files 27 and 100 of the data unit 18 in the address unit 19. This instruction is treated as a load data register and a load pointer register instruction and the correct value is obtained from memory and put into the load data queues 60. The transfer from the load data queues 60 to the address unit 19 and data unit 18 occurs independently and the data is maintained in the load data queue 60 until both units have read the appropriate data. The microinstructions in the instruction dispatch queues 29 and 41 necessary to load the guard registers 27 and 100 are stalled until the execution units of both the data unit 18 and the address unit 19 is empty of any guard modifier instructions. At that time the load guard register instructions can proceed to transfer the required value from the load data queue 60 into the guard register file without conflict with any other guard modifier instructions.

It will be appreciated that if the last occasion on which a guard value was modified was the result of executing a guard modifier instruction in the address unit 19, then that guard value held in the register file 100 of the address unit 19 will be the correct value although a copy would have been transferred into the master register file 27 of the data unit 18. The next time that guard value is required it is not necessary to waste execution cycles by seeking a transfer of the guard value from the data unit 18 to the address unit 19. The guard modifier instructions may themselves be provided with guards so that the guard value is only changed in the guard register files if the guard value is true. If however a guard modifier instruction is guarded by the G15 indicator which is always true and is supplied to the address unit for calculating the new guard value then the control unit 12 will be sure that the guard modifier instruction will be executed by the address unit and can assign ownership of that guard value to the address unit and indicate this in bit position 103 of the guard ownership register 102. The next time that the guard value is used on an instruction dispatched by unit 99 of the control unit 12, there is no requirement to provide a "send guard" instruction to the data unit 18 if the microinstruction is to be executed by the address unit 19 or general unit 21. The microinstruction fed to the address unit 19 or general unit 21 can derive the appropriate guard value directly from the shadow guard register file 100 provided in the address unit 19 with confidence that the guard value is correct.

A further situation in which this example c an avoid unnecessary loss of cycle time in the data unit 18 or in the address unit 19 arises when the required guard i s stable and has not been modified for a long interval in relation to the pipeline duration of the execution units. The dispatch 99 of control unit 12 is provided with the CU guard register 101 which contains a direct copy of the guard values from the master register file 27 supplied to the control unit 12 with a one cycle transfer delay. If the IDQ 29 of the data unit 18 indicates that no guard modifier instruction (or receive guard microinstruction which is treated by the data unit as a guard modifier instruction) has been stalled in the IDQ 29 or is still in the pipeline 13 or 14, then the guard value held in the control unit register 101 will be valid and a signal confirming this is provided as part of the communication path 120 between the data unit 18 and the control unit 12. This valid signal indicates in the register location 104 of the control unit 12 that the control unit is currently the guard owner of that guard value and the dispatch unit 99 can block the dispatch of any instruction for which the guard value is false thereby avoiding wasted cycles in the execution units of checking the guard value in order to find that it is false. If the guard value held in register 101 is true then the dispatch unit 99 will provide the guard indicator G15 which is always true so that the execution unit to which the instruction is delivered does not need to check whether the guard value is true or false by reference to a guard register file as the instruction is accompanied by the always true guard value G15.

Some examples of changing ownership of the guard value from the data unit 18 to the address unit 19 are illustrated by the following example.

| | |
|---|---|
| 1. | G0 guard ownership = Data Unit |
| 2. G0? call P3; | since Data Unit is the owner of G0 this instruction will generate a sndG (G0) > Address Unit |
| 3. . . . | |
| 4. G15? G0 = (a GMI executed by the AU) | G0 guard ownership = Address Unit |

-continued

| | | |
|---|---|---|
| 5. G0? call P3; | | since Address Unit is the owner of G0, this instruction will use the AU local copy of G0. No sndG is required |
| 6. . . . | | |
| 7. Gx? G0 = (a GMI executed by the DU) | | G0 guard ownership = Data Unit (Address unit loses ownership of G0) (unless Gx is known by the Control Unit to be false) |

In the above example, line 1 indicates the position where guard ownership of the guard value G0 is held by the data unit 18. In line 2 the dispatch unit 99 issues microinstructions to execute "call P3". P3 indicates the pointer register No 3. The instruction is guarded by the guard indicator G0 and as the data unit is the owner of that value the instruction will generate a "send guard" for indicator G0 to obtain the value of G0 from the master register file 27. The "call instruction" will be executed by the general unit 21 and consequently Slot 0 or Slot 1, of the address unit 19 requires that guard value. Line 4 indicates the execution of a guard modifier instruction in which the value of the guard indicator G0 is itself guarded by value G15 which is always true. The guard modification is to be done by a computation in the address unit 19 and consequently guard ownership of the guard value G0 will be transferred to the address unit. When the "call" instruction is again executed in line 5 and guarded by the value G0, the value to be attributed to G0 is now held in the shadow guard register file 100 of the address unit as the address unit is now the owner of the guard value G0. No "send guard" is required to be supplied to the data unit 18. In line 7 a further guard modifier instruction is supplied from the dispatch unit 99. It is a guard modifier instruction that modifies G0 which requires a computation by the data unit 18 in order to determine a new guard value to be loaded into the guard register file 27 for the guard indicator G0. This guard modifier instruction is guarded on Gx (x=0 to 15). This means that, provided Gx is not known by the control unit to be false, the guard ownership of G0 is now transferred back to the data unit 18 and the control unit 12 will indicate at a position 103 that the address unit has lost ownership of the guard value G0. It will be understood that address unit guard ownership only applies to AU or GU instructions; DU instructions will always obtain their guard values from the DU guard register file 27.

The invention is not limited to the details of the foregoing examples.

What is claimed is:

1. A computer system for executing instructions having assigned guard indicators, which system comprises instruction supply circuitry, a plurality of parallel execution units for receiving respective instructions from the supply circuitry, each instruction having a respective guard indicator selected from a set of guard indicators, common to the plurality of execution units, one of said execution units including a master guard value store containing a master representation of current values for the guard indicators in said set of guard indicators, another of said execution units including a shadow guard value store containing a secondary representation of values for the guard indicators in said set, guard ownership circuitry to indicate whether said shadow guard value store owns the current value for a guard indicator, and guard value transfer circuitry operable to transfer a guard value from said master store to said another execution unit thereby enabling selection of a guard value for said another of said execution units from either the master or shadow guard value store depending on the indication of the guard ownership.

2. A computer system according to claim 1 in which said execution unit includes circuitry for executing guard value modifying instructions and said guard value transfer circuitry is operable to transfer to, and thereby update, said master guard value store any modified guard value generated in said another execution unit.

3. A computer system according to claim 1 in which the instruction supply circuitry comprises a control unit common to each parallel execution unit, said control unit including said guard ownership circuitry and being operable in response to an indication of guard ownership to supply to the execution unit instructions to enable access to a selected one of the guard value stores.

4. A computer system according to claim 3 in which said control unit includes a further secondary store of guard values and said guard ownership circuitry is operable to indicate whether ownership of a selected guard value is held by said secondary store of guard values in the control unit.

5. A computer system according to claim 4 in which said control unit includes an instruction dispatch unit for dispatching instructions to said parallel execution units, said dispatch unit being responsive to said secondary store of guard values and to said guard ownership circuitry to prevent dispatch of instructions for which the guard value is false and owned by the control unit.

6. A computer system according to claim 5 in which said dispatch unit is operable to dispatch an instruction with a predetermined guard value requiring normal execution of the instruction in response to locating that the guard value for the instruction is owned by the control unit and indicated by said secondary store as a true value.

7. A computer system according to claim 6 in which each execution units operates a pipelined operation with synchronised pipelined cycles for each of the execution units.

8. A computer system according to any one of the preceding claims in which said execution unit include execution pipelines providing access to a data memory, said pipelines including a first set of pipelines for use in executing instructions needed for memory access operations and a second set of pipelines arranged to carry out arithmetic operations, thereby providing decoupling of memory access operations from arithmetic operations.

9. A computer system according to claim 8 in which two parallel pipelines are provided for arithmetic operations and access a common set of data registers including said master guard value store.

10. A computer system according to claim 1 in which two parallel pipelines are provided for addressing operations used for memory accesses, said two pipelines accessing a common register file including said shadow guard value store.

11. A computer system according to claim 1 in which said guard value stores comprise register files.

12. A method of executing instructions in a computer system, said instructions having assigned guard indicators, which method comprises supplying a plurality of instructions to parallel execution units, each instruction having a respective guard indicator selected from a set of guard indicators common to the plurality of execution units, holding a master set of current values for the guard indicators in one execution unit, holding a shadow set of guard values in another execution unit, indicating which execution unit has guard ownership for the guard indicator of any one instruction being executed, execution of an instruction in said another execution unit obtaining the guard value from the shadow value if guard ownership of that guard indicator is owned by said another execution unit or effecting a transfer of the master guard value from said one execution unit if guard ownership of that guard value is not owned by said another execution unit.

13. A method according to claim 12 including executing instructions to modify said guard values wherein execution of an instruction to modify a guard value in said one execution unit updates said master value without changing said shadow value.

14. A method according to claim 13 in which execution of an instruction in said another execution unit to modify a guard value is used to update said shadow guard value and to transfer the new guard value to update the master value in said one execution unit.

* * * * *